United States Patent [19]

Escaravage

[11] Patent Number: 4,825,594
[45] Date of Patent: May 2, 1989

[54] WINDOW-RAISER DEVICE FOR A MOTOR VEHICLE

[75] Inventor: Gerard Escaravage, Valentigney, France

[73] Assignee: ECIA - Equipements ET Composants Pour L'Industrie Automobile, Audincourt, France

[21] Appl. No.: 248,070

[22] Filed: Sep. 23, 1988

[30] Foreign Application Priority Data

Sep. 23, 1987 [FR] France .................................. 8713147

[51] Int. Cl.$^4$ ............................................. E05F 11/44
[52] U.S. Cl. ..................................................... 49/351
[58] Field of Search .................. 49/348, 349, 351, 374, 49/375, 377

[56]   References Cited
U.S. PATENT DOCUMENTS 3,466,802  9/1969  Doveims et al. ................. 49/374 X
4,004,371  1/1977  Podolan et al. ........................ 49/352
4,329,816  5/1982  Koike ..................................... 49/350

Primary Examiner—Philip C. Kannan
Attorney, Agent, or Firm—Sughrue, Mion, Zinn, Macpeak and Seas

[57]   ABSTRACT

This window-raiser device, of the type comprising means for actuating a mechanism for raising and lowering the window, with arms in an X (1,2), in which the ends of the arms comprise pads (3,4) sliding in a slide (5) of a support structure (6) comprising means (7) for fastening the window, is characterized in that breakable stop means (8,9) are provided in the path of movement of the pads (3,4) in the slide, such that when the pads are up against these stop means (8,9) they lock the support structure (6) in position with respect to the pads (3,4) and therefore to the window-raiser mechanism and thereby determine a position for mounting the window in the means (7) for fastening the window on the support structure (6), the stop means (8,9) being breakable by the pads (3,4) at the time of the first maneuver tending to separate them.

8 Claims, 2 Drawing Sheets

WINDOW-RAISER DEVICE FOR A MOTOR VEHICLE

The present invention relates to a window-raiser device for a motor vehicle.

A certain number of window-raiser devices for a motor vehicle of the type comprising means for actuating a mechanism for raising and lowering the window, with arms in an X, in which the ends of the arms comprise pads sliding in a slide of a support structure comprising means for fastening the window are already known in the state of the art.

These fastening means consist of, for example, a stub of a lip of the fastening means, adapted in order to engage in a recess of the window, as described in European Patent Application EP-A No. 0,208,237.

Moreover, the document U.S. Pat. No. 4,004,371 also discloses means for fastening a window which comprise a plate in which two perforations are arranged and through which two screws adapted in order to engage in two corresponding holes of the window extend in order to fasten this window on the plate and, therefore, on the rest of the raising and lowering mechanism of the latter.

However, all these devices have a certain number of drawbacks, particularly with respect to the mounting thereof.

In fact, this mounting consists in introducing the mechanism for raising and lowering the window inside the door casing, in sliding the window through the corresponding slot in the door and finally in fastening the window in the fastening means of the support structure of the mechanism for raising and lowering the window.

These operations have to be performed "blind" inside the door casing to which access is very difficult. Moreover, because of the design of the raising and lowering mechanism, which comprises pads sliding in the slide of the support structure on which the means for fastening the window are provided, this support structure may move freely with respect to the rest of the mechanism such that the fitters must grope for a reasonable length of time before finding the ideal position for this support structure and therefore for the fastening means with respect to the complementary fastening elements of the window, in order to achieve the fastening of the latter on the support structure.

Moreover, the guiding pads currently used suffer from a considerable amount of wear which, with time, gives rise to a play which upsets the operation of the window-raiser device and introduces vibrations which are the source of noises.

The invention therefore aims to solve these problems by proposing a window-raiser device which is simple, reliable, of a low cost price and which makes it possible to ensure very easy mounting of the window in the means for fastening the latter.

To this end, the subject of the invention is a window-raiser device, particularly for a motor vehicle, of the type comprising means for actuating a mechanism for raising and lowering the window, with arms in an X, in which ends of the arms comprise pads sliding in a slide of a support structure comprising means for fastening the window, characterized in that breakable stop means are provided in the path of movement of the pads in the slide such that when the pads are up against these stop means, they lock the support structure in position with respect to the pads and therefore to the window-raiser mechanism and thereby determine a position for mounting the window in the means for fastening the window on the support structure, the stop means being breakable by the pads at the time of the first manoeuvre tending to separate them.

Advantageously, the pads have a rectangular longitudinal section and they are mounted so as to articulate about pivots fastened on the corresponding ends of the arms.

The invention will be better understood with reference to the following description, given solely by way of example and made with reference to the appended drawings, wherein.

Figure 1:
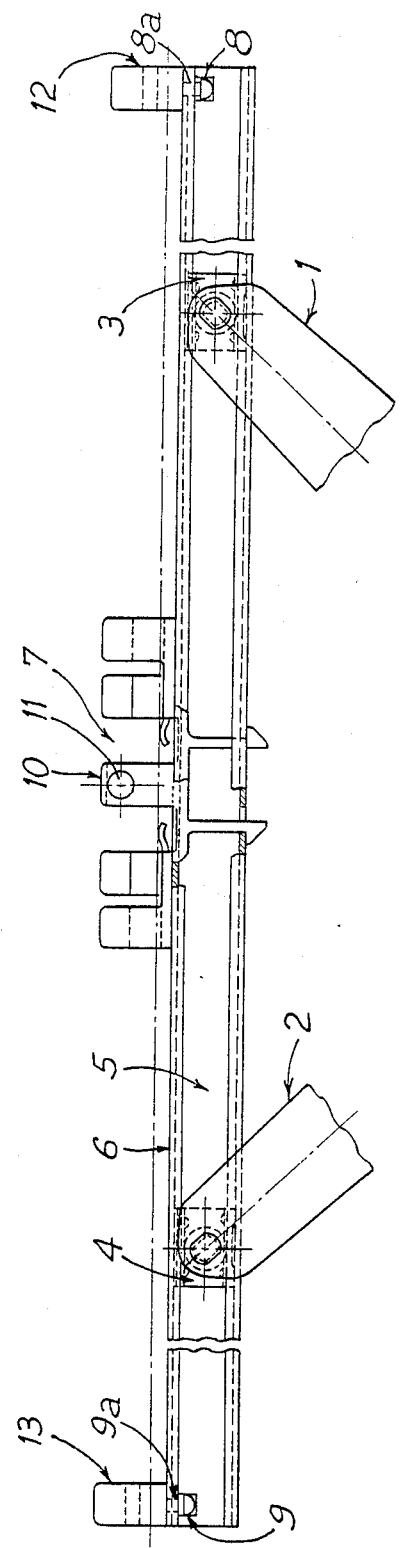
FIG. 1 represents a partial view of a window-raiser device according to the invention.

As may be seen in FIG. 1, a window-raiser device according to the invention comprises means (not shown) for actuating a mechanism for raising and lowering the window, with arms in an X, given reference numerals 1 and 2 respectively in this figure, in which the ends of the arms 1 and 2 comprise pads 3 and 4, respectively, sliding in a slide 5 of a support structure 6 comprising means 7 for fastening the window (not shown). Since the means for actuating this mechanism for raising and lowering the window, with arms in an X, is well known in the state of the art, they will not be described in detail and it will simply be noted that these actuating means may consist of manual means actuated, for example, by a handle or electric means comprising an actuating gear motor.

According to the invention, stop means 8 and 9 are provided in the path of movement of the pads 3 and 4, respectively, in the slide 5 of the support structure such that when the pads 3 and 4 are up against the stop means 8 and 9 they lock the support structure 6 in position with respect to the pads 3 and 4 and therefore to the rest of the window-raiser mechanism and thereby determine a stable position for mounting the window in the means 7 for fastening the latter on the support structure 6. In fact, by locking the position of the support structure 6 with respect to the pads by means of the stop means 8 and 9, the fastening means 7 are also locked in a specific position, for example in the path of movement of the complementary means provided on the window in order to ensure the fastening of the latter on the fastening means 7 of the support structure. In this way, the fitter no longer has to grope to find the ideal position for the fastening means 7. These fastening means consist, for example of a certain number of lips for centering and positioning the lower part of the window, one, 10, of these lips comprising, for example, a stub 11 adapted in order to engage in a corresponding recess of the window in order to ensure the fastening of the latter on the support structure.

The stops means 8 and 9 are breakable by the pads 3 and 4 at the time of the first manoeuvre of the means for actuating the mechanism for raising and lowering the window which tends to separate the latter. In this way, once they are broken, these stop means 8 and 9 will no longer impede the normal operation of the window-raiser device.

As may be seen on this FIG. 1, the stop means 8 and 9 each consist of a protecting part extending transversely in the slide 5 of the support structure, these projecting parts being connected via zones 8a, 9a of less resistance, to means 12, 13 for positioning the window on the support structure arranged at each end of the latter.

Figure 2:
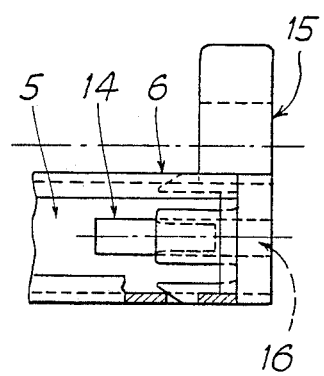
FIG. 2 represents a detailed view representing a second embodiment of stop means included in the structure of a device according to the invention.

However, and as may be seen on FIG. 2, the stop means may also comprise fingers 14 extending longitudinally in the slide 5 of the support structure 6, these fingers 14 being connected via zones of less resistance to means 15 for positioning the window on the support structure 6.

Advantageously, the fingers 14 are retractable inside recesses, for example 16, of the positioning means, by means of the said pads at the time of the first manoeuvre of the actuating means tending to separate them.

In this case also, the stop means are arranged close to each end of the slide 5.

Figure 3:
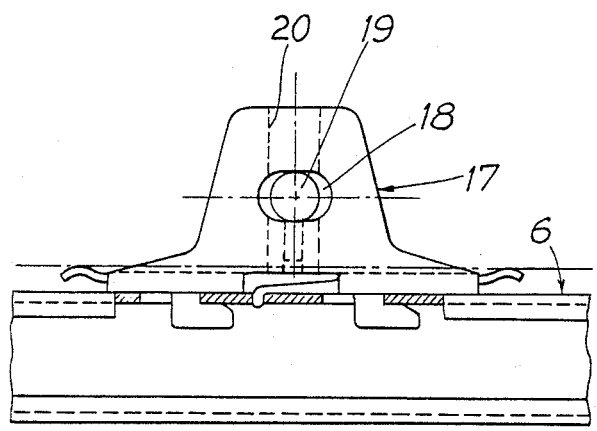
FIG. 3 represents another detail view representing a second embodiment of fastening means included in the structure of the device according to the invention.

As may be seen on FIG. 3, which represents a variation in embodiment of the fastening means, the latter may comprise, for example, two lips facing one another, only one 17 of which is visible, fastened on the support structure 6 and each comprising a recess 18 adapted in order to interact with a stub 19 which is integral with the windows. Moreover, the guiding means 20 consisting, for example, of inclined planes, may also be provided on the lips in order to ensure guiding of the stub 19 when it descends in the fastening means.

Figure 4:
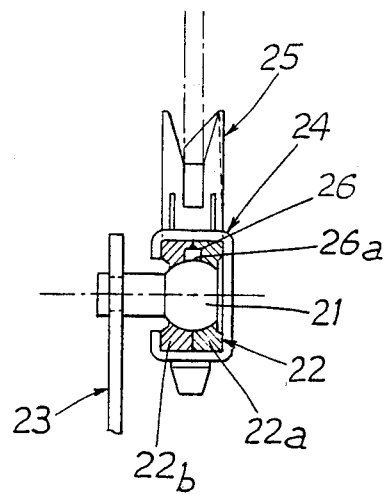
FIG. 4 represents a side view illustrating the link between an arm of a mechanism for raising and lowering the window and a support structure included in the structure of a device according to the invention.

As is represented in FIGS. 1 and 4, the pads may have a rectangular longitudinal section and they are mounted so as to articulate about pivots, for example 21, like the pad 22 represented in FIG. 4, these pivots being fastened on the corresponding ends of the arms, for example 23.

Advantageously, each pad consists of two parts 22a, 22b fastened on one another, these pads being arranged in a slide 24 of a support structure comprising means for fastening the window and centering and positioning means, for example 25, of a type such as described above.

In this manner, this structure of the pads makes it possible to improve their movement in the slide and prevents excessive wear thereof as was the case in the state of the art. Moreover, the manoeuvring of the device for actuating the window is also enhanced.

Finally, each pivot, for example 22, may also comprise breakable projecting parts, for example 26, connected to the corresponding pivot via a zone 26a of less resistance and locked between the two parts of the pad in order to lock the latter in position with respect to the pivot in order to facilitate its mounting in the slide of the support structure, the projecting parts being breakable at the time of the first manoeuvre tending to move these pads.

I claim:

1. Window-raiser device, particularly for a motor vehicle, of the type comprising means for actuating a mechanism for raising and lowering the window, with arms in an X (1,2; 23), in which ends of the arms comprise pads (3,4; 22) sliding in a slide (5; 24) of a support structure (6) comprising means (7) for fastening the window, characterized in that breakable stop means (8,9; 14) are provided in the path of movement of the pads (3,4; 22) in the slide such that when the pads (3,4; 22) are up against these stop means (8,9; 14) they lock the support structure (6) in position with respect to the pads (3,4; 22) and therefore to the window-raiser mechanism and thereby determine a position for mounting the window in the means (7) for fastening the window on the support structure (6), the stop means (8,9; 14) being breakable by the pads (3,4; 22) at the time of the first manoeuvre tending to separate them.

2. Device according to claim 1, characterized in that the stop means comprise projecting parts (8,9) extending transversely in the slide (5) of the support structure (6), these projecting parts being connected via zones (8a 9a) of less resistance, to means (12,13) for positioning the window on the support structure (6).

3. Device according to claim 1, characterized in that the stop means comprise fingers (14) extending longitudinally in the slide (5) of the support structure (6), these fingers being connected via zones of less resistance to means (15) for positioning the window on the support structure (6).

4. Device according to claim 3, characterized in that the fingers (14) are retractable inside recesses (16) of the positioning means (15) via the said pads (3,4).

5. Device according to claims 1, 2, 3 or 4, characterized in that the stop means (8,9; 14) are arranged close to the ends of the slide (5).

6. Device according to claims 1, 2, 3 or 4, characterized in that the pads (3,4; 22) have a rectangular longitudinal section and in that they are mounted so as to articulate about pivots (21) fastened on the ends of the arms (1,2; 23).

7. Device according to claim 6, characterized in that the said pads (22) comprise two parts (22a, 22b) fastened on one another.

8. Device according to claim 7, characterized in that the pivots (21) comprise breakable projecting parts (26) extending in the pads (22) in order to lock the latter with respect to the pivots, these projecting parts being breakable by the pads at the time of the first manoeuvre tending to move them.

* * * * *